US007194940B2

(12) United States Patent
Hsieh

(10) Patent No.: US 7,194,940 B2
(45) Date of Patent: Mar. 27, 2007

(54) ELECTRONIC TORSIONAL TOOL

(76) Inventor: Chih-Ching Hsieh, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/230,771

(22) Filed: Sep. 21, 2005

(65) Prior Publication Data

US 2006/0011023 A1 Jan. 19, 2006

Related U.S. Application Data

(63) Continuation-in-part of application No. 10/608,577, filed on Jun. 25, 2003, now abandoned.

(51) Int. Cl.

*B25B 23/144* (2006.01)
*B25B 23/159* (2006.01)
*G01L 1/22* (2006.01)

(52) U.S. Cl. .......................................... 81/479; 73/862

(58) Field of Classification Search .................. 81/479; 73/862, 41, 86.2, 622; 177/21

See application file for complete search history.

(56) References Cited

U.S. PATENT DOCUMENTS

| | | | | |
|---|---|---|---|---|
| 4,397,196 | A * | 8/1983 | Lemelson | 73/862.23 |
| 4,602,538 | A * | 7/1986 | Neuhaus | 81/467 |
| 5,303,601 | A * | 4/1994 | Schonberger et al. | 73/862.23 |
| 5,503,028 | A * | 4/1996 | Brihier | 73/862.21 |
| 5,685,206 | A * | 11/1997 | Ma | 81/77 |
| 6,463,811 | B1 * | 10/2002 | Putney | 73/862.21 |

* cited by examiner

*Primary Examiner*—Lee D. Wilson
*Assistant Examiner*—Alvin J Grant

(57) ABSTRACT

An enhancing structure of an electronic torsional tool having an electronic strain gauge for measuring a torsional force applied thereon; wherein the electronic torsional tool having a main body comprising: an extending rod mounted in the main body and extended through a longitudinal length of the main body, so as to enhance flexibility of the main body. The main body is provided with a hole to enhance flexibility of the main body. The extending rod is extended through a longitudinal length of the hole of the main body, so as to enhance the strength of the hole of the main body. The strain gauge is mounted in the hole of the main body.

9 Claims, 12 Drawing Sheets

ELECTRONIC TORSIONAL TOOL

The present invention is a continuation in part of U.S. patent Ser. No. 10/608,577, filed Jun. 25, 2003, now abandoned assigned to and invented by the inventor of the present invention. Thus the contents of the U.S. patent Ser. No. 10/608,577 is incorporated into the present invention as a part of the specification of the present invention.

BACKGROUND OF THE INVENTION

1. Field of the Invention

The present invention relates to an electronic torsional tool, and more particularly to an electronic torsional tool provided with a hole and an extending rod to enhance flexibility and deformation of the electronic torsional tool.

2. Description of the Related Art

A conventional pointer type torsional wrench in accordance with the prior art shown in FIG. 8 comprises a drive shank 10 having a first end formed with a drive head 11, a handle 14 pivotally mounted on a second end of the drive shank 10 by a pivot shaft 15, a torsion scale 13 secured on the drive shank 10 and located adjacent to the handle 14, and a pointer rod 12 integrally extended from the drive head 11 and having a free end pointed to the torsion scale 13. The pointer rod 12 is in parallel with the drive shank 10 at the normal state.

In operation, the drive head 11 is fitted on a workpiece (by a socket for example). The operator exerts a force on the handle 14 to rotate the drive shank 10 of the wrench and to operate the workpiece. The handle 14 is pivoted with the drive shank 10 by the pivot shaft 15, so that the force in each direction exerted by the operator on the handle 14 can be concentrated on the pivot shaft 15 and can be transmitted to the drive shank 10 of the wrench. Thus, when the force applied on the drive shank 10 of the wrench exceeds a predetermined value, the pointer rod 12 deviates from the drive shank 10 through a relative angle, so that the pointer 120 of the pointer rod 12 can indicate the torsion value exerted on the wrench by the deflecting angle between the pointer rod 12 and the drive shank 10.

However, the conventional pointer type torsional wrench has the following disadvantages.

1. The operator has to exert a torsional force on the handle 14 successively so that the pointer 120 of the pointer rod 12 can read the torsion values. Thus, the indicated torsion reading values are not accurate because the successive force applied by the operator is not evenly distributed.

2. The pointer rod 12 protrudes from the drive shank 10, so that it is easily hit by a foreign object, thereby affecting the accuracy of the pointer rod 12.

3. The operator has to exert a torsional force on the handle 14 successively so that the pointer 120 of the pointer rod 12 can read the torsion values, thereby wasting the operator's energy.

A conventional spring type torsional wrench 16 in accordance with the prior art shown in FIG. 9 is disclosed in the Taiwanese Patent Publication No. 288375. The output torsion of the torsional wrench 16 is adjustable. When the force applied on the wrench exceeds a predetermined value, the wrench idles, thereby limiting the torsion exerted by the operator to a determined value. However, the torsional wrench 16 cannot clearly indicate the torsion reading values.

A conventional single-rod type torsional wrench 30 in accordance with the prior art shown in FIG. 10 is disclosed in the Taiwanese Patent Publication No. 485872. Another conventional single-rod type torsional wrench 32 in accordance with the prior art shown in FIGS. 11, 12 and 12A is disclosed in the Taiwanese Patent Publication No. 488991. The above-mentioned single-rod type torsional wrench is formed with a plurality of recesses for receiving the strain gauge, the bridge and the digital indicator.

A conventional double-rod type torsional wrench in accordance with the prior art shown in FIG. 13 is disclosed in the U.S. Pat. No. 4,958,541. The above-mentioned double-rod type torsional wrench comprises a solid inner rod 18 co-operating with a strain gauge, and a hollow outer rod 17 mounted on the solid inner rod 18.

SUMMARY OF THE INVENTION

The primary objective of the present invention is to provide an electronic torsional tool, wherein the main body is provided with a hole and an extending rod to enhance flexibility of the main body.

Another objective of the present invention is to provide an electronic torsional tool, wherein the hole and the extending rod of the main body enhance deformation of the main body, so as to increase deformation of the strain gauge.

A further objective of the present invention is to provide an electronic torsional tool, wherein the hole of the main body is located in a torsion deformation zone consisting of the handle portion and the drive portion of the main body.

A further objective of the present invention is to provide an electronic torsional tool, wherein the hole and the extending rod are extended through the handle portion and the drive portion of the main body, thereby enhancing deformation of the main body, and thereby increasing deformation (or distortion) of the strain gauge, so as to detect and obtain the torsion values exactly.

A further objective of the present invention is to provide an electronic torsional tool, wherein the extending rod is extended through a longitudinal length of the hole of the main body, so as to enhance the strength of the hole of the main body.

In accordance with the present invention, there is provided

Further benefits and advantages of the present invention will become apparent after a careful reading of the detailed description with appropriate reference to the accompanying drawings.

DETAILED DESCRIPTION OF THE INVENTION

Figure 1:
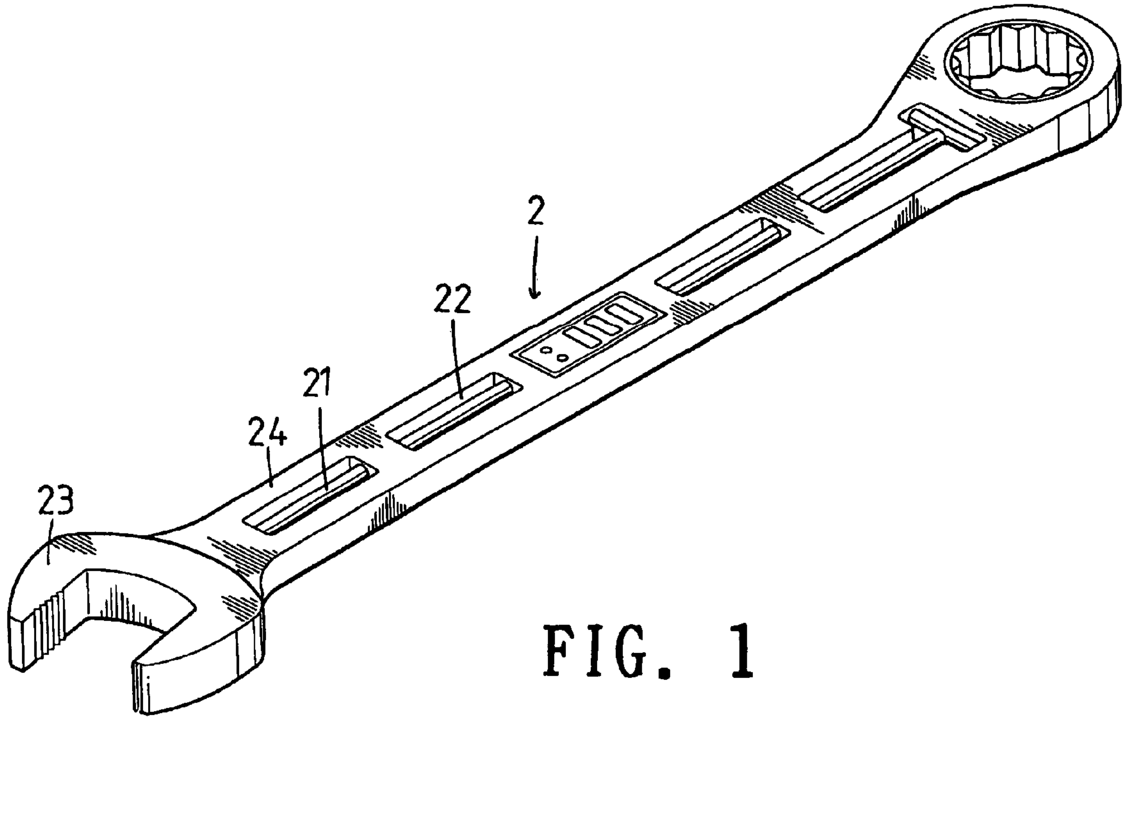
FIG. 1 is a perspective view of an electronic torsional tool in accordance with the preferred embodiment of the present invention.
Figure 1A:
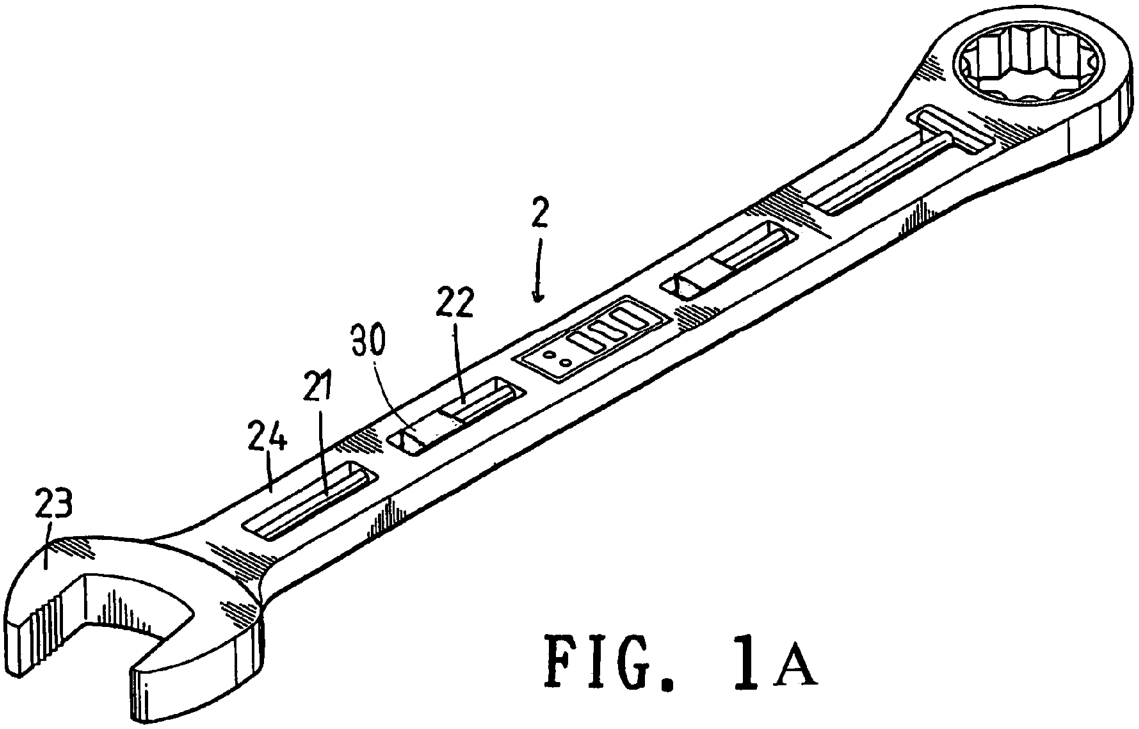
FIG. 1A shows a perspective view of an electronic torsional tool of the present invention, where a strain gauge is installed therein.
Figure 2:
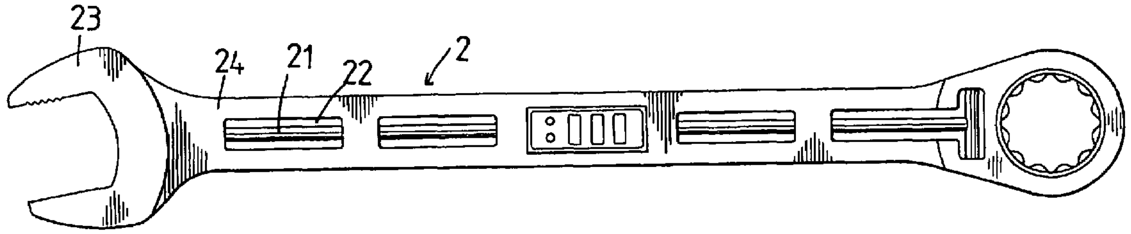
FIG. 2 is a top plan view of the electronic torsional tool as shown in FIG. 1.
Figure 3:
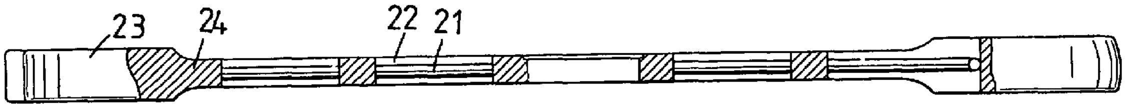
FIG. 3 is a front plan partially cross-sectional view of the electronic torsional tool as shown in FIG. 1.

Referring to the drawings illustrated in FIGS. 1–3, an electronic torsional tool having an enhancing structure in accordance with the preferred embodiment of the present invention is an electronic torsional wrench. The tool comprises a main body 2, and a strain gauge 30 (see FIG. 1A) mounted in the main body 2. In operation, when the electronic torsional tool is operated, the strain gauge 30 is deformed to produce a signal which is transmitted through a circuit (not shown) to a display unit 31 so as to provide and indicate the present torsion value to the user. The structure and operation of the strain gauge are conventional and will not be further described in detail.

The main body 2 is provided with a handle portion 24 and a drive portion 23 located at a distal end of the handle portion 24. The main body 2 is provided with a hole 22 to enhance flexibility of the main body 2. Preferably, the hole 22 is extended through a longitudinal length of the main body 2. The strain gauge is mounted in the hole 22 of the main body 2. Thus, the hole 22 enhances deformation of the main body 2, so as to increase deformation of the strain gauge.

Referring to FIG. 1A, it is illustrated that the strain gauges 30 are installed in one of the hole 22 and a display 31 is installed in the handle portion 24.

Figure 10:
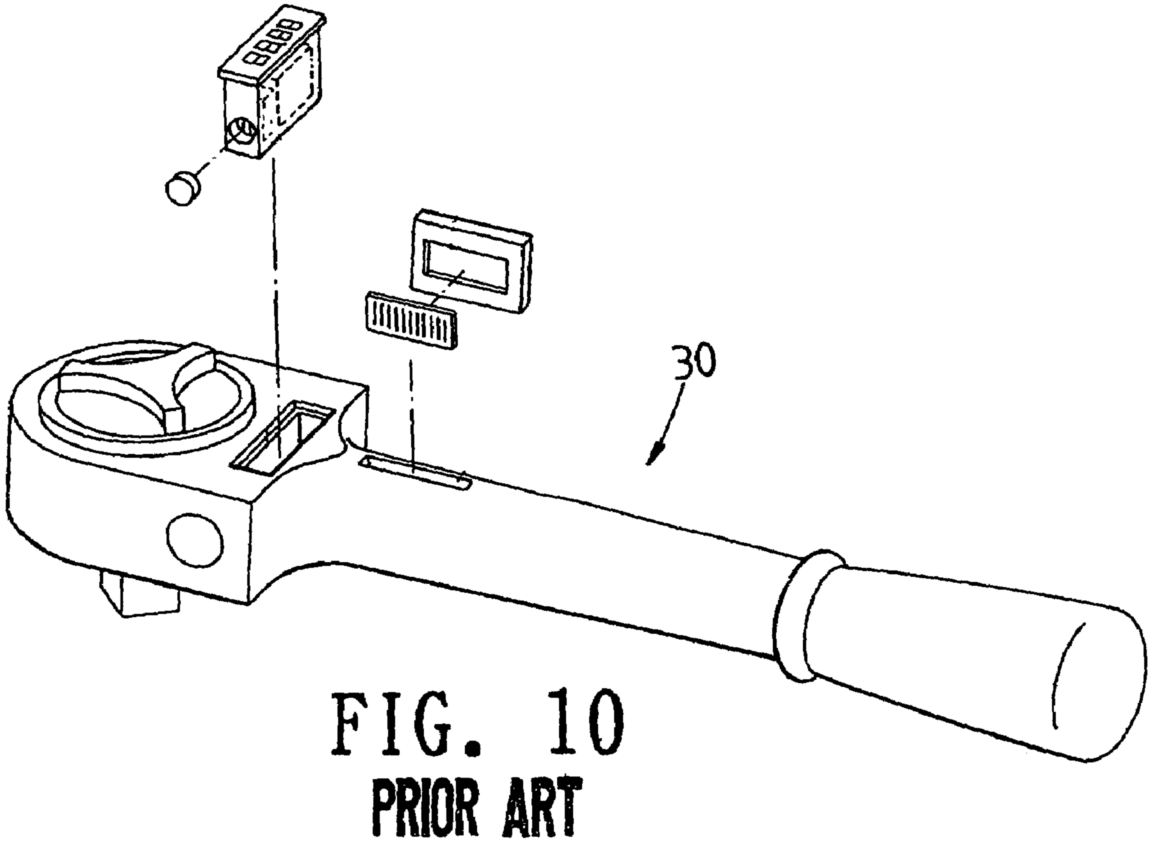
FIG. 10 PRIOR ART
FIG. 10 is an exploded perspective view of a conventional single-rod type torsional wrench in accordance with the prior art.
Figure 11:
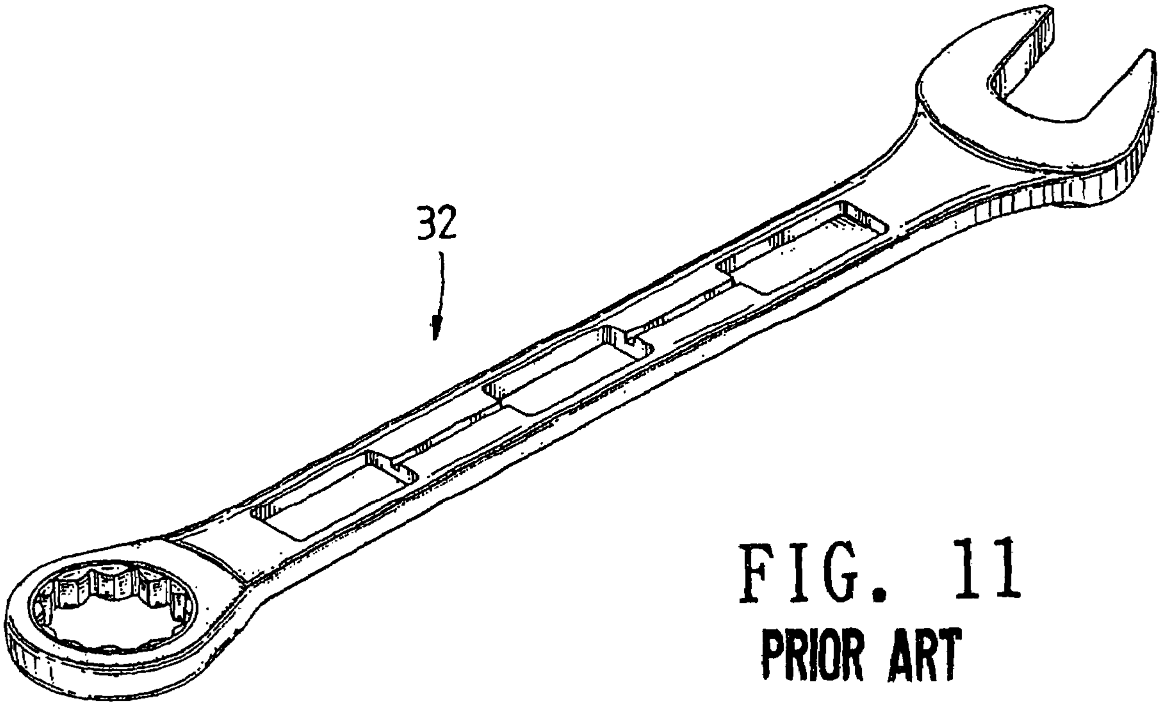
FIG. 11 PRIOR ART
FIG. 11 is a perspective view of another conventional single-rod type torsional wrench in accordance with the prior art.
Figure 12A:
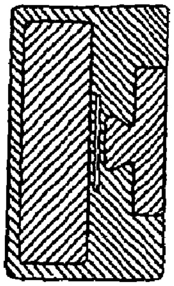
FIG. 12A PRIOR ART
FIG. 12A is a side plan cross-sectional view of the conventional single-rod type torsional wrench as shown in FIG. 12.
Figure 12:
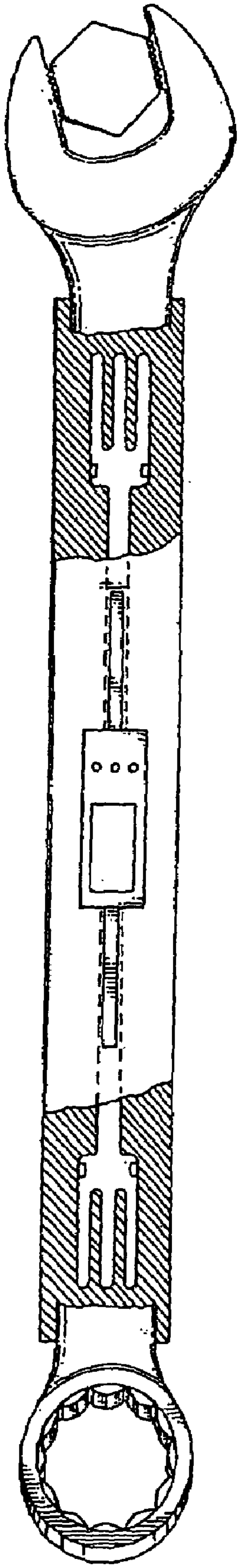
FIG. 12 PRIOR ART
FIG. 12 is a top plan cross-sectional view of the conventional single-rod type torsional wrench as shown in FIG. 11.
Figure 13:
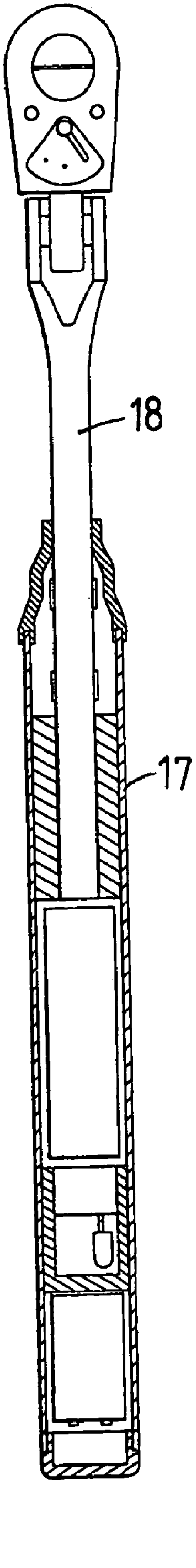
FIG. 13 PRIOR ART
FIG. 13 is a top plan cross-sectional view of a conventional double-rod type torsional wrench in accordance with the prior art.

In comparison, in the conventional torsional wrench as shown in FIGS. 10–12, the recess is only used for receiving the strain gauge, the bridge and the digital indicator. In the electronic torsional tool in accordance with the present invention, the hole 22 enhances deformation of the main body 2, so as to increase deformation of the strain gauge 30. Thus, the function and structure of the hole 22 in the present invention are quite different from that of the recess in the conventional torsional wrench as shown in FIGS. 12–14.

In addition, the electronic torsional tool further comprises an extending rod 21 mounted in the main body 2 and extended through a longitudinal length of the hole 22 of the main body 2, so as to enhance the strength of the hole 22 of the main body 2. Preferably, the extending rod 21 is made of a soft metallic material, such as an aluminum alloy. Thus, the extending rod 21 and the hole 22 of the main body 2 can enhance deformation of the main body 2.

In practice, the hole 22 is extended through the handle portion 24 and the drive portion 23 of the main body 2 and the extending rod 21 is extended through the longitudinal length of the hole 22 of the main body 2, thereby enhancing deformation of the main body 2, and thereby increasing deformation (or distortion) of the strain gauge, so as to detect and obtain the torsion values exactly.

Figure 4:
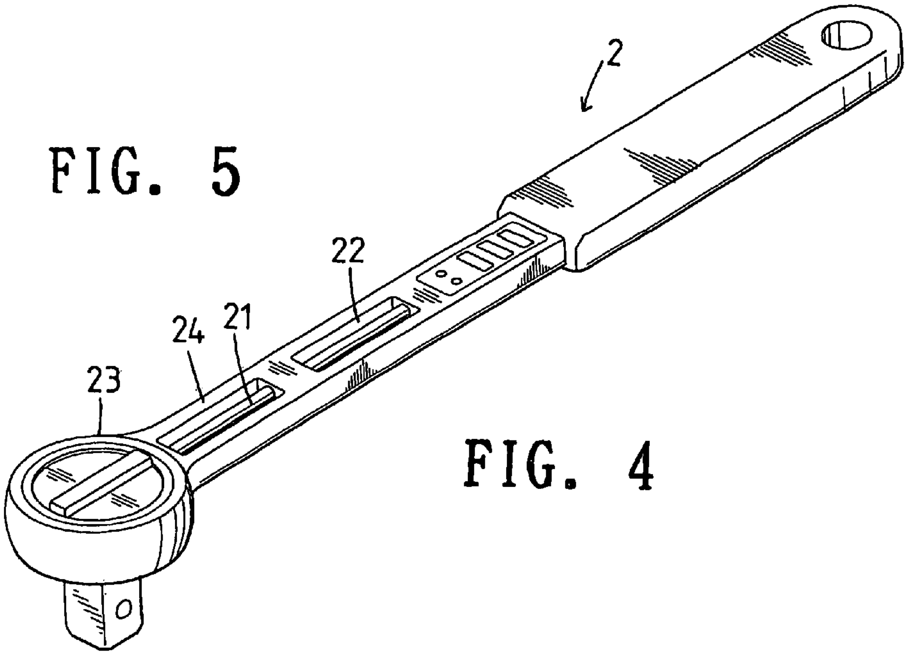
FIG. 4 is a perspective view of the electronic torsional tool in accordance with another embodiment of the present invention.

As shown in FIG. 4, the electronic torsional tool in accordance with another embodiment of the present invention is a D-headed electronic torsional wrench.

Figure 5:
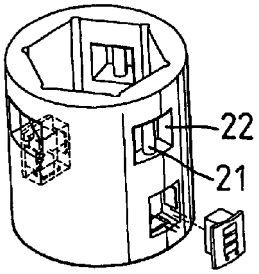
FIG. 5 is a perspective view of the electronic torsional tool in accordance with another embodiment of the present invention.

As shown in FIG. 5, the electronic torsional tool in accordance with another embodiment of the present invention is an electronic torsional socket.

Figure 6:
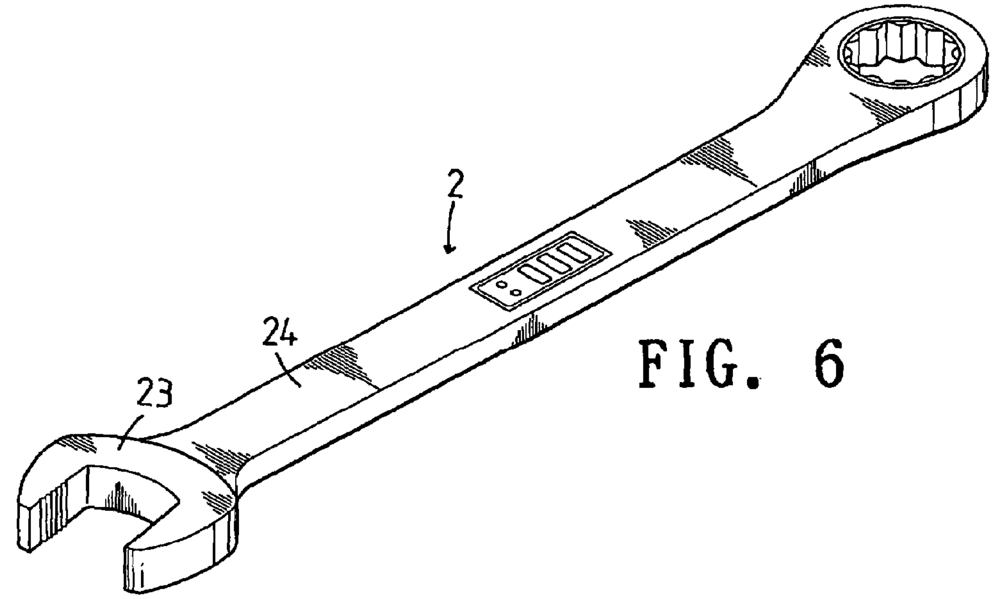
FIG. 6 is a perspective view of the electronic torsional tool in accordance with another embodiment of the present invention.
Figure 7:
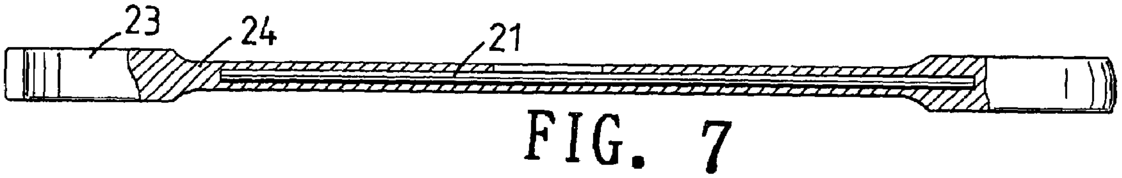
FIG. 7 is a front plan partially cross-sectional view of the electronic torsional tool as shown in FIG. 6.
Figure 8:
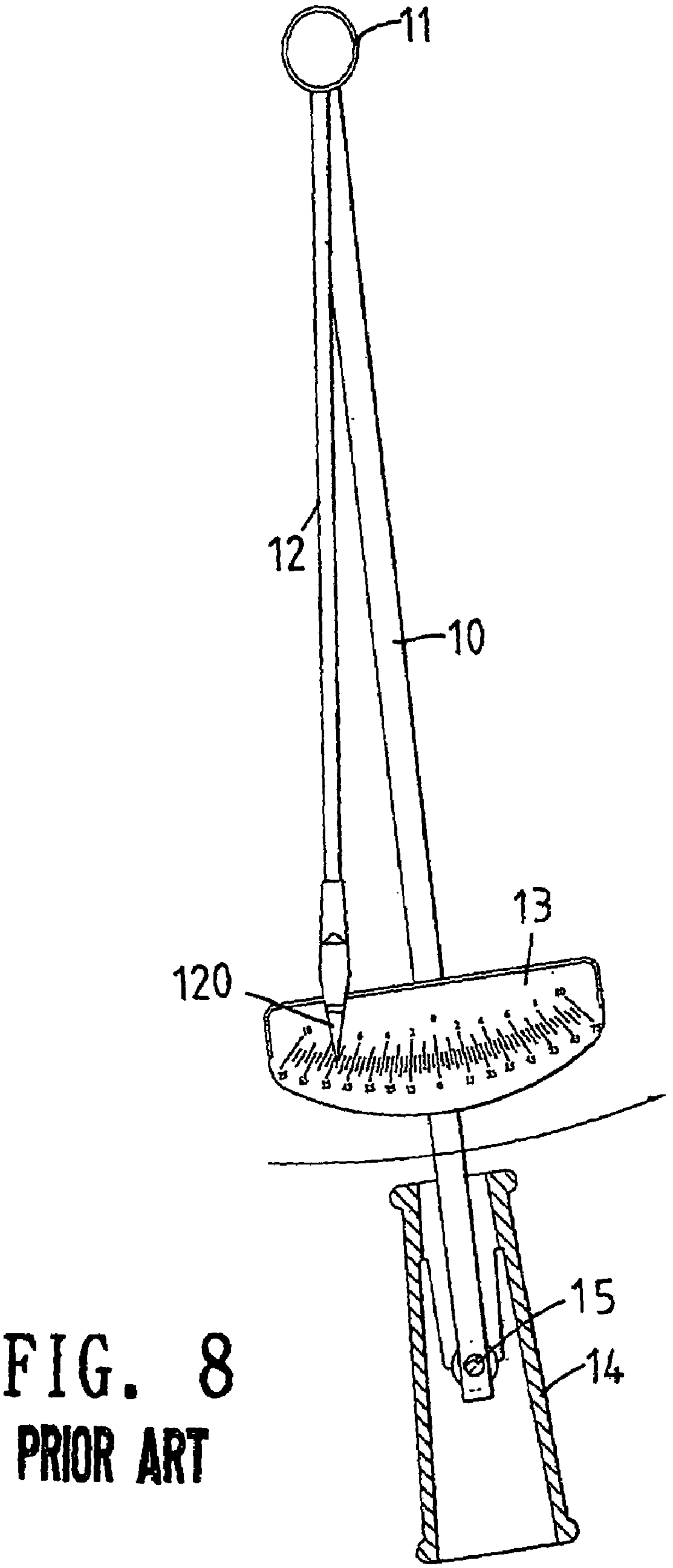
FIG. 8 PRIOR ART
FIG. 8 is a top plan cross-sectional view of a conventional pointer type torsional wrench in accordance with the prior art.
Figure 9:
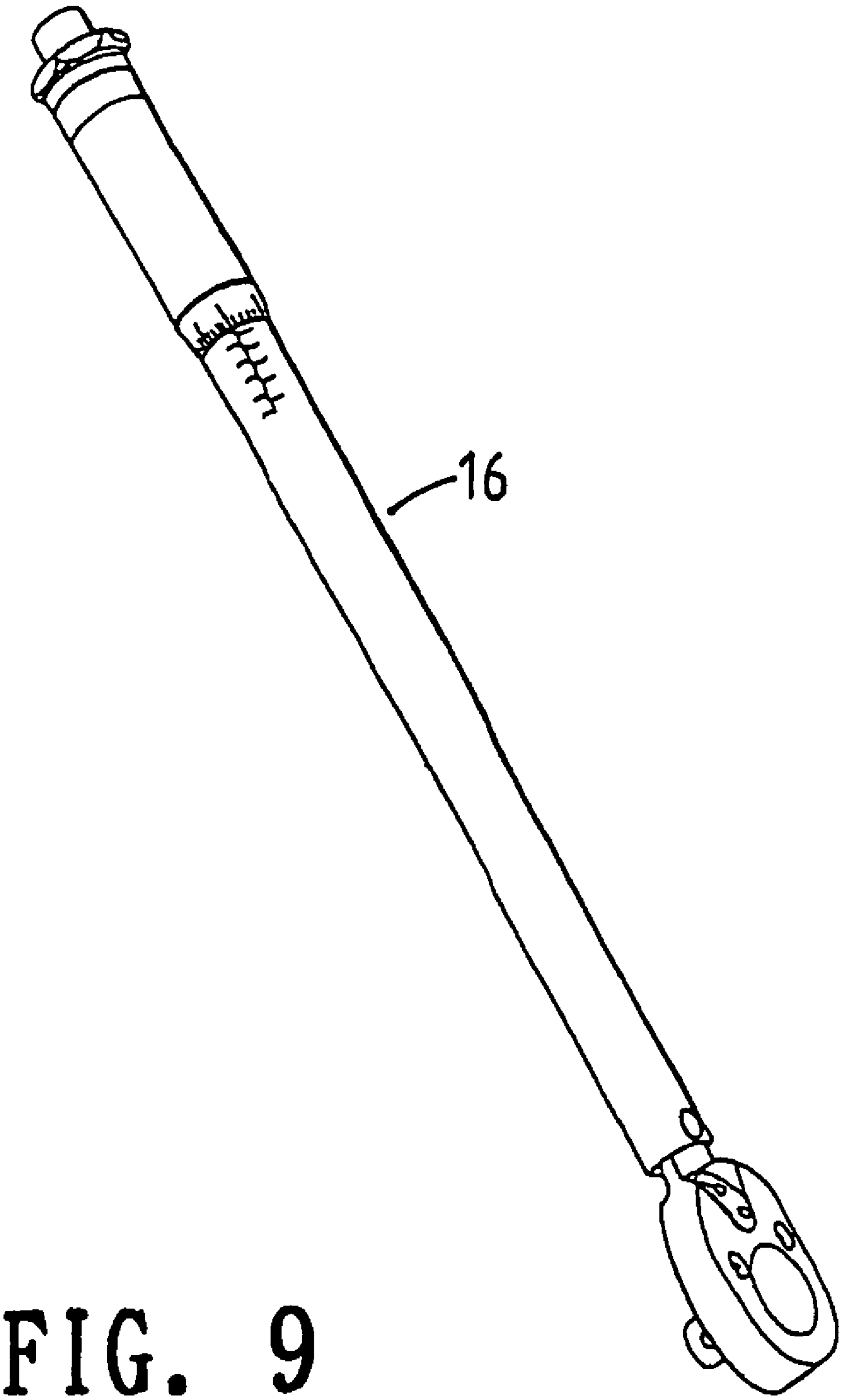
FIG. 9 PRIOR ART
FIG. 9 is a perspective view of a conventional spring type torsional wrench in accordance with the prior art.

As shown in FIGS. 6 and 7, the electronic torsional tool in accordance with another embodiment of the present invention is shown, in this embodiment, no hole is formed in the main body 2 is undefined, and the extending rod 21 is hidden in an interior of the main body 2.

Figure 1B:
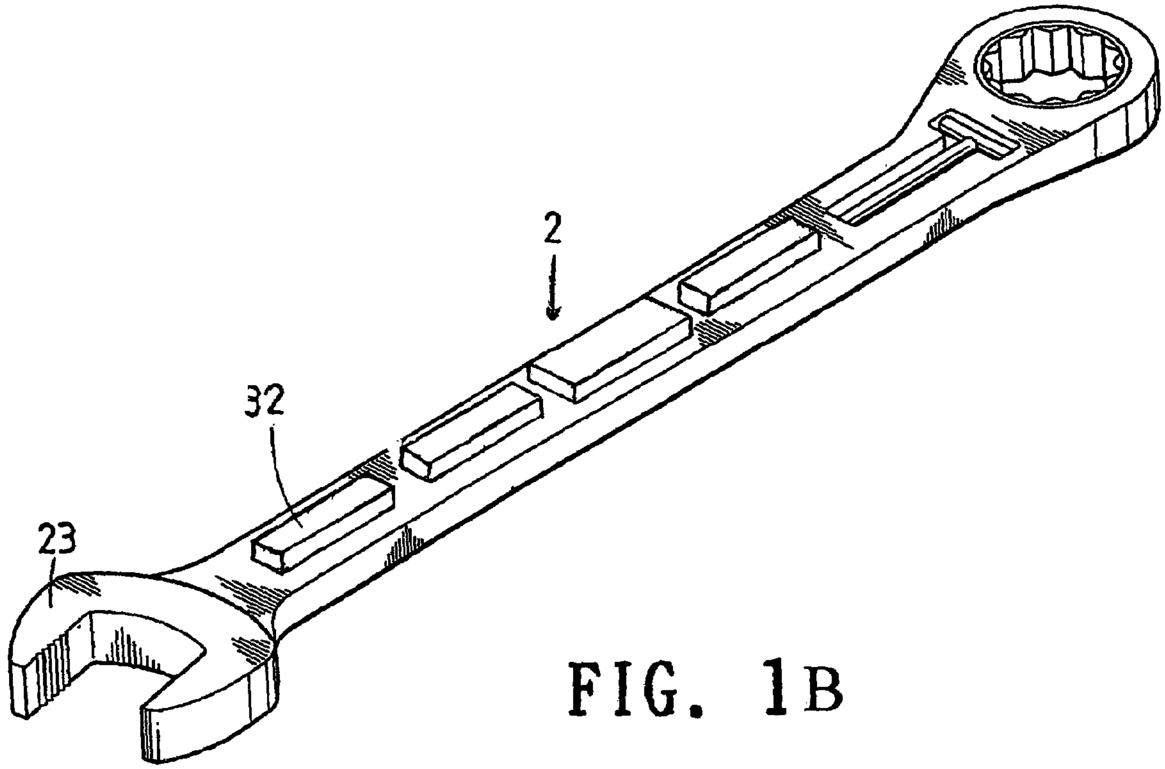
FIG. 1B shows one application of the present invention, where covers are added to the tool of the present invention.

Preferably, referring to FIG. 1B, the electronic torsional tool further comprises cover 32 directly mounted on the main body 2 in a riveting manner to encompass the hole 22 of the main body 2 so as to protect the main body 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An enhancing structure of an electronic torsional tool having an electronic strain gauge for measuring a torsional force applied thereon; wherein the electronic torsional tool having a main body comprising:

a handle;

at least one driving portion;

a plurality of holes which are sequentially arranged along a longitudinal direction of the handle of the tool; one of the holes at one end of the handle being a T shape hole; and each hole penetrating through the handle body;

a display being located at one of the holes;

a strain gauge being located at one of the holes;

an extending rod mounted in the main body and extended through a longitudinal length of the main body, so as to enhance flexibility of the main body; and one end of the extending rod at the T shape hole having a T shape and the rod extends through each hole.

2. The enhancing structure in accordance with claim 1, wherein there are five holes.

3. The enhancing structure in accordance with claim 1, wherein the extending rod is made of a soft metallic material.

4. The enhancing structure in accordance with claim 1, wherein the extending rod is made of an aluminum alloy.

5. The enhancing structure in accordance with claim 1, wherein the electronic torsional tool is an electronic torsional wrench.

6. The enhancing structure in accordance with claim 1, wherein the electronic torsional tool is a D-headed electronic torsional wrench.

7. The enhancing structure in accordance with claim 1, wherein the electronic torsional tool is an electronic torsional socket.

8. The enhancing structure in accordance with claim 1, wherein the extending rod is hidden in the main body.

9. The enhancing structure in accordance with claim 1, further comprising a plurality of covers covering upon an opening of each the holes; each cover only covering a respective one of the holes, but does not enclose the handle.

* * * * *